3,658,771
PREPARING AMMONIUM POLYACRYLATES
Henry Volk, Bay City, and Percy Jay Hamlin, Midland, Mich., assignors to The Dow Chemical Company, Midland, Mich.
No Drawing. Filed Jan. 14, 1969, Ser. No. 791,193
Int. Cl. C02b 1/20; C08d 1/04; C08f 3/46
U.S. Cl. 260—80 M
9 Claims

ABSTRACT OF THE DISCLOSURE

Polyacrylates are prepared in aqueous solution under specially controlled reaction conditions to produce efficient flocculants. Ammonium acrylate is polymerized at a monomer concentration within the range from about 10 weight percent of the polymerization system up to the monomer saturation level, in the presence of at least 0.1 weight percent of ammonium hydroxide. The upper limit on the amount of hydroxide employed will range downwardly from about 15 weight percent to approximately 5 weight percent for monomer concentrations from 10 to 40 weight percent respectively. Further improvement in polymer properties is achieved by the incorporation of at least about 1 weight percent, based on the weight of polymerization system, of an alkali metal salt.

---

Because it is readily polymerized and used extensively in polymerization reactions, acrylic acid has been the subject of numerous polymerization studies. Usually this monomer is polymerized as an acid. Previous studies have shown that increasing the pH of the acrylic acid polymerization system decreases both the degree and rate of polymerization. See for example, Kogyo Kagaku Zasshi, Journal Chemical Society, Japan, Industrial Chemical Section, volume 58, pages 194–196 (1955).

Although acrylic acid can be polymerized to high molecular weight, flocculant grade polymers in the acid form, it is necessary in the processing of the polymerizate to mix a neutralizing reagent with the polymer gel. This is a difficult physical operation inasmuch as the aqueous polymerizates are very viscous and not readily mixed with other reagent, such as ammonium hydroxide.

It would be particularly desirable to provide an improved process for the preparation of ammonium polyacrylates. Especially desirable would be polymers of this nature characterized by high molecular weights and flocculation utilities. A further object is to provide a polymerization process which produces such polymers directly.

The instant invention is directed to the above ends and involves polymerizing an alkali metal or ammonium acrylate, or methacrylate, in water solution under especially controlled reaction conditions.

In the practice of the polymerization process of the invention, monomer concentration is maintained within the range from about 10 weight percent of the aqueous polymerization charge up to the monomer saturation level, preferably from about 20 to about 40 weight percent of the aqueous polymerization charge. To this solution is added enuogh ammonium hydroxide to provide at least 0.1 percent by weight thereof based on the weight of the monomer solution. Depending upon the monomer concentration, the upper limit on the amount of hydroxide added will range from about 15 to about 5 weight percent, based on the total weight of the system, as the monomer concentration increases from about 10 to about 40 weight percent. Somewhat lower amounts of the hydroxide are desirable as the monomer saturation level is approached. The temperature of the reaction system is maintained within the range from about 0 up to about 100° C., preferaby from about 25° to about 60° C. A pressurized polymerization vessel is employed at the higher temperatures to prevent escape of ammonia.

Although the process of the invention is essentially directed to the preparation of homopolymers of the ammonium acrylates, e.g., ammonium acrylate and methacrylate, alkali metal acrylates and methacrylates, as well as small amounts of other monomers compatible with the polymerization charge can be included in the polymerization system. Normally comonomers, i.e., monomers other than ammonium or alkali metal acrylates, will comprise less than about 25 weight percent of the monomer charge. Examples of suitable comonomers include sodium styrene sulfonate, sodium ethylene sulfonate, 2-sodioethyl acrylate, vinyl acetate and maleic acid, and the like. In general, any anionic or nonionic monomer which is soluble in the polymerization system and is not adversely affected by the excess ammonia can be copolymerized with the acrylates in accordance with the invention.

Further improvement in the above described polymerization process is achieved by introducing into the polymerization system at least about 1 percent by weight of an alkali metal or ammonium salt such as ammonium, sodium or potassium chloride or sulfate. Such salts yield polymers of even higher molecular weight and greater flocculation efficiencies. These salts are useful at concentrations up to and exceeding the saturation level for the given system.

The above described recipes are polymerized by known techniques. Most conveniently the reaction is carried out as a solution polymerization reaction in water. Alternate modes include suspension and emulsion polymerization techniques whereby a monomer solution is first prepared and then either suspended or emulsified in a water immiscible liquid such as an aromatic or aliphatic liquid hydrocarbon.

Initiation of polymerization is accomplished by purging the monomer system of inhibitory oxygen and applying suitable catalytic means, such as chemical free radical catalysts or high energy irradiations, including X-rays, gamma rays and high energy electrons. Suitable chemical catalysts include sodium persulfate, potassium persulfate, ammonium persulfate, azobisbutyronitrile, tertiary butylhydroperoxide and in general any of the peroxidic acid polymerization initiators not adversely affected by the high pH. Also operable are the redox initiator systems which involve the use of a reducing agent conjunctively with the oxidizing reagent.

Following completion of the polymerization reaction, the polymer is recovered by any convenient technique. When the polymerization is conducted in aqueous solution, the polymer may be recovered as by drum drying the polymerizate. Emulsion and suspension polymerization systems are well adapted for removing water by azeotropic distillation followed by a liquid-solids separation, as by filtering.

Polymers prepared in accordance with the invention are characterized by high molecular weights and thus good flocculation utilities. Since molecular weight determinations are time consuming, a first approximation thereof is made by measuring the viscosity of a standard polymer solution. For the purposes hereof, this determination is obtained on a 0.4 percent by volume solution of the polymer in 0.5 $\underline{N}$ NaCl at pH 7.9. The viscosity measurement is made with an Ostwald viscometer at 30° C. Polymers prepared in accordance with the invention are characterized by such a viscosity of at least 10 centipoises.

The instant invention will be further illustrated by reference to the following specific embodiments.

EXAMPLE 1

Freshly distilled acrylic acid in an amount of 76.6 grams was mived with a solution of 168.7 grams of 28 percent ammonium hydroxide in 153 grams of water and the mixture was charged to a one liter resin flask equipped with a stirrer, nitrogen sparger, gas outlet and thermometer. Air was removed from the monomer system by sparging with nitrogen. Polymerization was initiated at room temperature by the addition of sodium meta bisulfite in an amount of 0.003 percent followed by potassium persulfate in an amount of 0.006 percent, said percentages being based on the weight of ammonium acrylate.

Also prepared in an essentially similar manner were polymerization systems containing different levels of ammonium hydroxide. Polymerization was carried out at ambient room temperature and the polymerizates analyzed for residual monomer. From this data, the conversions of monomer to polymer were calculated for each recipe.

The polymers were isolated from the polymerizates by precipitation with methanol. Volatiles were removed by drying at about 40°–50° C. in a vacuum oven. The viscosity of the dried product was determined using an Ostwald viscometer to measure 0.4 percent by volume polymer solutions in 0.5 normal sodium chloride.

The activity of the polymers as flocculants was determined by flocculation tests on a 10 percent by volume slurry of montmorillonite clay in a 0.6 normal sodium hydroxide solution. The clay suspension was contained within a stoppered 100 milliliter graduate. The suspension was treated with an applicating solution containing 0.025 weight percent of dissolved polymer at doses of 1, 2 and 3 milliliters. After mixing the polymer with the clay suspension according to a standard procedure, which involved rotating the graduate three times after introduction of the polymer, the lapsed time for the interface between the clarifying supernatant liquid and settling solids to descend from the 90 milliliter to the 60 milliliter mark was measured. These times are reported as the "flocculation times."

The recipes to prepare several polymers and the measurements of physical characteristics and flocculation times are reported as Examples 1–7.

and fluocculation properties, increased conversion to polymer did result.

Although the invention has been illustrated by solution polymerization techniques, it should be understood that other modes of polymerization may incorporate the improvements and advantages of the instant invention. For instance, inverse emulsion and bead suspension polymerization techniques may be carried out utilizing monomer solutions in which the monomer concentration and solution pH are adjusted in accordance with the parameters of the instant invention. Basically, in these polymerization techniques the monomer solution is suspended in a heat transfer medium with either an emulsifying or polymeric suspending agent. Details as to such suspension techniques are set forth in U.S. Pats. 3,211,708, 3,278,506 an 3,284,393.

Depending upon the particular polymerization technique utilized, the polymer may be simply recovered from the polymerizate as by drying the polymerizate to recover the polymer solids. More conveniently, precipitation and, in the instance of the emulsion and suspension polymerization techniques, precipitation or azeotropic drying followed by filtration of the polymer solids from the polymerization medium may be employed to recover polymer solids. It should be understood, however, that separation of the polymer solids is not necessary to their useful application. For instance, the polymer gels and suspensions thereof can be directly employed to prepare polymer applicating solutions and, in some instances, the emulsion polymer systems can be applied as flocculants without prior dilution.

What is claimed is:

1. A method for preparing alkali metal and ammonium polyacrylates which comprises:
   (1) forming an aqueous solution containing from about 10 percent by weight to about 40 percent by weight dissolved alkali metal or ammonium acrylate or methacrylate and at least 0.1 percent ammonium hydroxide based on the weight of the monomer solution with an overall upper limit on the amount of ammonium hydroxide present of about 15 percent by weight based on the weight of the monomer solution,
   (2) purging the monomer solution of inhibitory oxygen and

|  | Polymerization conditions | | | | | | | Results | | | | |
|---|---|---|---|---|---|---|---|---|---|---|---|---|
|  | Percent catalyst | | | | | | | | | M.B. clay floc. time (sec.) | | |
| Reference | $NH_4$ acrylate | $K_2S_2O_8$ | $Na_2S_2O_5$ | $NH_3$ excess | Time, hrs. | Temp., °C. | pH | Conv., percent | Visc. | 1 ml. | 2 ml. | 3 ml. |
| Example 1 | 23.0 | .003 | .0015 | None | 40 | *22–25 | 7.5 | 54.6 | 9.8 | | 112 | 72 |
| Example 2 | 23.67 | .005 | .0025 | 7.3 | 20 | *22–25 | 9.9 | 83 | 24 | 34 | 17 | 8 |
| Example 3 | 23.67 | .005 | .0025 | 9.3 | 20 | *22–25 | 10.1 | 74 | 29.1 | 31 | 14 | 8 |
| Example 4 | 23.67 | .005 | .0025 | 18.1 | 20 | *22–25 | 10.6 | <20 | | | | |
| Example 5 | 30 | .01 | .005 | None | 20 | *22–25 | 7.0 | 81.9 | 49.9 | 21.3 | | |
| Example 6 | 30 | .01 | .005 | 0.1 | 20 | *22–25 | 7.22 | 86.5 | 38.2 | 31.7 | | |
| Example 7 | 30 | .01 | .005 | 1.0 | 20 | *22–25 | 8.75 | 96.0 | 48.7 | 31.5 | | |

* Room temperature.

It will be observed from Examples 2 through 3, as compared to Example 1, that superior results were obtained in regard to conversion of monomer to polymer, molecular weight and flocculation when the ammonia concentration was properly adjusted. The results from Example 4 demonstrate the effect of an excessive concentration of ammonia. In this run the conversion of monomer to polymer was less than 20 percent.

In Example 5, 6 and 7, 30 percent by weight based on total solution weight of ammonium acrylate was polymerized in the presence of essentially none, 0.1 and 1.0 percent based on total solution weight of ammonia. Although such small amounts of ammonium hydroxide gave no apparent advantage as regards polymer viscosity (3) polymerizing the resulting monomer system at a temperature within the range from about 0° up to 100° C. in the presence of a polymerization catalyst therefor whereby a high molecular weight, water-soluble polyelectrolyte is produced.

2. A method as in claim 1 and including the additional step of separating the polyelectrolyte from the polymerizate.

3. A method as in claim 1 wherein the acrylate concentration is within the range from about 20 to 40 percent by weight of the total polymerization system.

4. A method as in claim 1 wherein the acrylate is an ammonium salt of acrylic acid.

5. A method as in claim 1 wherein the acrylate is an ammonium salt of methacrylic acid.

6. A method as in claim 1 and including the additional step of introducing from about 1 percent by weight up to its saturation level of an alkali metal or ammonium inorganic salt to the polymerization charge.

7. A method as in claim 6 wherein the salt is sodium chloride.

8. A method as in claim 6 wherein the salt is sodium sulfate.

9. A method as in claim 6 wherein the salt is ammonium sulfate or ammonium chloride.

References Cited

UNITED STATES PATENTS

| 3,405,106 | 10/1968 | Scanley | 260—80 |
| 3,472,243 | 10/1969 | Wall | 132—7 |
| 3,493,3500 | 2/1970 | Volk | 210—54 |

FOREIGN PATENTS

| 500,475 | 2/1939 | Great Britain | 260—80 |
| 642,423 | 6/1962 | Canada | 260—80 |
| 777,306 | 6/1957 | Great Britain | 260—80.3 |

JOSEPH L. SCHOFER, Primary Examiner

C. A. HENDERSON, JR., Assistant Examiner

U.S. Cl. X.R.

204—159.22; 209—5; 210—54; 260—78.5 R, 79.3 M, 85.7